United States Patent [19]

Wem

[11] 4,382,900
[45] May 10, 1983

[54] CENTRIFUGAL GAS-LIQUID CONTACT APPARATUS

[75] Inventor: James W. Wem, Middlesbrough, England

[73] Assignee: Imperial Chemical Industries PLC, London, England

[21] Appl. No.: 293,335

[22] Filed: Aug. 17, 1981

[30] Foreign Application Priority Data

Sep. 1, 1980 [GB] United Kingdom ................ 8028174

[51] Int. Cl.³ .............................................. B01F 3/04
[52] U.S. Cl. ...................................... 261/89; 261/96; 261/97; 366/105
[58] Field of Search .................................. 261/88–90, 261/79 A; 422/225; 366/102, 105, 314; 159/6 R

[56] References Cited

U.S. PATENT DOCUMENTS

| 1,039,677 | 9/1912 | Theisen ................................. 261/90 |
| 3,034,730 | 5/1962 | Pilo et al. ........................... 261/88 X |
| 3,544,084 | 12/1970 | Macrow ............................. 261/90 X |
| 3,809,375 | 5/1974 | Bonnet ............................... 261/90 X |
| 4,283,255 | 8/1981 | Ramshaw et al. ................. 261/89 X |

FOREIGN PATENT DOCUMENTS

| 565756 | 7/1954 | Belgium ............................... 261/90 |
| 1366312 | 9/1974 | United Kingdom .................. 261/89 |

Primary Examiner—Richard L. Chiesa
Attorney, Agent, or Firm—Cushman, Darby & Cushman

[57] ABSTRACT

In centrifugal gas-liquid contact apparatus, liquid hold-up is reduced by the provision of guide means to separate the liquid outflow from the gas inflow to the rotor.

3 Claims, 4 Drawing Figures

CENTRIFUGAL GAS-LIQUID CONTACT APPARATUS

This invention is concerned with centrifugal gas-liquid contact apparatus. More specifically, it concerns such apparatus comprising a rotor, means to feed gas and liquid to said rotor and means to remove gas and liquid respectively from said rotor.

Various centrifugal devices for gas-liquid contacting have been proposed, including that described in U.K. Pat. No. 757149 of Claes Wilhelm Pilo. More recently, we have ourselves described in European Patent Publication No. 0 002 568 a centrifugal gas-liquid contact apparatus having a permeable element of large interfacial area. The emphasis in such prior devices has been on improving the efficacy of the gas-liquid contacting.

While such improved contacting is indeed important, there are other problems arising in the practical carrying out of that contacting in apparatus operating on a commercial scale. One such problem is that large volumes of gas have to be introduced to the fast-moving rotor, countercurrent to the liquid which is emerging from the rotor. Resulting entrainment of emerging liquid in the gas stream can lead to the liquid being swept back into the interior of the rotor. While this may not be important from the point of view of efficient contacting, since it only leads to liquid being contacted for a longer period than intended, from the operating standpoint it represents inefficient use of the capacity of the apparatus.

We have now found that this problem can be substantially reduced or avoided by providing on the rotor, guide means to separate, at least partially, the liquid outflow from the gas inflow to the rotor.

Thus gas-liquid contact apparatus according to the present invention comprises a rotor, means to feed gas and liquid to said rotor and means to remove gas and liquid respectively from said rotor, and is characterised in that guide means are provided on the rotor to separate, at least partially, the liquid outflow from the gas inflow to the rotor.

The gas-liquid contact apparatus to which our invention is applied includes any of the apparatus of this type which has been previously described, for example in the above-mentioned prior patent publications of Pilo and of ourselves. The invention is of particular value when applied to such apparatus provided with permeable packings, especially the packings of large interfacial area disclosed in our above-mentioned European Patent Publication.

In saying that the guide means which characterise the present invention are provided "on the rotor," we do not mean that the guide means must be mounted on the exterior of the rotor. It is intended only that the guide means be disposed upon the exterior or within the interior of the rotor so as to be a feature of the rotor and therefore rotate therewith.

The guide means may take a variety of forms. Thus baffles may be employed to divert the liquid outflow or the gas inflow to the rotor so as at least partially to separate these flows.

In general, the volume of gas flowing through the apparatus will normally exceed the volume of liquid flowing and it is preferred to divert the liquid, especially when the gas flow rate sufficiently exceeds the liquid flow rate as to carry liquid back into the rotor. For example, if the gas is normally introduced to the rotor through apertures in the external axial face of the rotor, then it is preferred to divert the radially outward-flowing liquid away from those apertures. Thus the guide means may take the form of baffles within the rotor or baffles, ridges or channels on the inner face of the radially outer wall of the rotor, so disposed as to intercept liquid which might otherwise flow through the gas inlet apertures and reduce the outward flow of liquid through those apertures. The diverted liquid may be led to flow from the rotor via liquid outlet apertures separately provided.

Since the volumetric flow rate of the gas will often greatly exceed that of the liquid, the cross-sectional area of any gas inlet apertures will normally, in aggregate, exceed that of any liquid outlet apertures, sometimes by a multiple. By providing guide means such as channels on the inner face of the radially outer wall of the rotor, it is possible to divert liquid falling on the parts of the face between the gas and liquid apertures and thereby increase the effective "catchment area" for the liquid outlet apertures. In this way, the said catchment area may amount to 40 percent or 50 percent or more of the total area of the inner face of the rotor wall.

The invention will be further described by reference to the accompanying drawings, in which.

Figure 1:
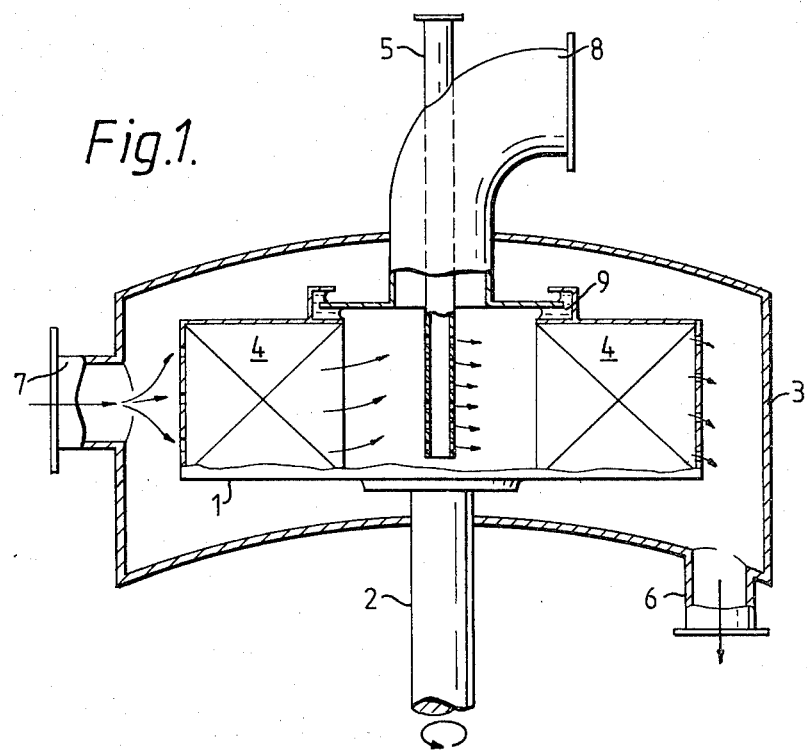
FIG. 1 illustrates, in schematic axial section, a form of gas-liquid contacting apparatus which may incorporate the feature according to the present invention.

The gas-liquid contacting apparatus of FIG. 1 comprises a rotor 1 mounted upon a vertical shaft 2 by means of which it is rotated within a casing 3. The rotor 1 contains a permeable packing 4 distributed as an annulus about its axis of rotation.

Liquid is introduced to the apparatus via a liquid feed pipe 5 and is directed through orifices in the lower end of pipe 5 on to the inner surface of packing 4. Rotation of rotor 1 subjects the liquid to high acceleration in an outward direction and the liquid permeates rapidly through the packing 4, encountering a counter-current flow of gas within the packing before being expelled from the outer face of the rotor and subsequently removed from the casing 3 via a liquid discharge pipe 6. The gas enters the apparatus via a gas feed pipe 7, passes under pressure inwardly through the packing 4 countercurrent to the outward flow of liquid, and is subsequently discharged through gas discharge pipe 8. By-passing of the packing 4 by the gas under pressure is minimised or prevented by means of a liquid seal 9.

Figure 2:
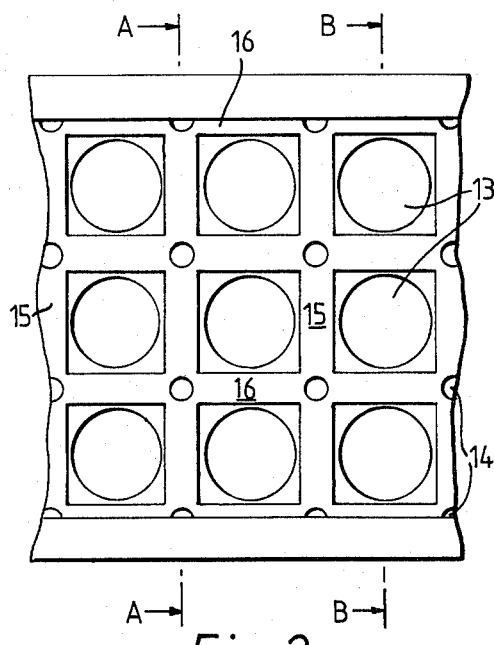
FIG. 2 illustrates in plan view a part of the inner surface of the radially outer wall of the rotor of a gas-liquid contacting apparatus incorporating the feature according to the present invention.
Figure 3:
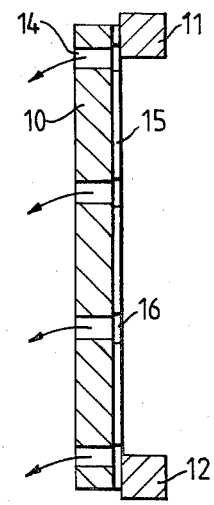
FIG. 3 is a sectional view taken along the line A—A of FIG. 2.
Figure 4:
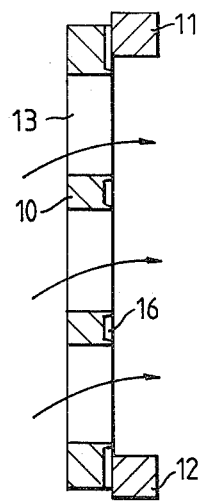
FIG. 4 is a sectional view taken along the line B—B of FIG. 2.

Referring now to FIGS. 2 to 4, the outer wall 10 of the rotor 1 is a cylinder, the inner surface of a short circumferential length of which is shown in FIG. 2. The wall 10 is secured against the outer circumference of the upper and lower faces 11 and 12 of the rotor by means not shown.

Rotor wall 10 is pierced around its entire circumferential length by larger apertures 13 for admission of gas and by smaller apertures 14, disposed uniformly among the apertures 13 and provided to allow discharge of treated liquid. The inner surface of rotor wall 10 is criss-crossed by a network of liquid channels in the form of vertical channels 15, parallel to the axis of the rotor, and horizontal channels 16, following the circumference of the rotor.

In operation of the device according to the present invention as illustrated, liquid permeating radially outwardly through the rotor packing will arrive uniformly across the whole of the inner face of rotor wall 10. Liquid falling on apertures 13 must overcome the "draught" inwards of gas entering via these apertures but liquid falling on the surface crossed by channels 15 and 16 flows along those channels, collects in the vicinity of the apertures 14 and, by virtue of its volume, largely prevents inward flow of gas through these latter apertures and itself flows out through these apertures 14.

Since the liquid flowing out through apertures 14 is made up of liquid falling on channels 15 and 16, liquid falling directly upon apertures 14 and a proportion of the liquid falling upon the square areas surrounding the apertures 13, the effective catchment area for such liquid is a multiple of the area of the apertures 14 themselves and amounts to of the order of 55 percent of the total area of the inner face of rotor wall 10.

Thus by incorporating in gas-liquid contact apparatus the feature which characterises the present invention, improved discharge of treated liquid from the rotor is achieved. In this way, liquid "hold-up" or carrying back within the packing is minimised or eliminated and the potential capacity of the apparatus is more fully employed.

It will be appreciated that, although the apparatus specifically described above is designed to operate about a vertical axis of rotation, it is equally possible to apply the present invention to alternative forms of gas-liquid contact apparatus in which the axis of rotation is horizontal or inclined.

I claim:

1. A centrifugal gas-liquid contact apparatus comprising:
   a hollow cylindrical rotor having a longitudinal rotation axis, a cylindrical outer peripheral sidewall having means defining a first plurality of axially and angularly distributed gas inlet apertures therethrough and a second plurality of axially and angularly distributed liquid outlet apertures therethrough, respectively for the inward passage of gas and outward passage of liquid, a first end wall, and a second, opposite end wall having means defining a central aperture therethrough;
   a shaft operatively connected coaxially to the rotor at said first end wall so that rotation of the shaft produces corresponding rotation of the rotor;
   a liquid feed pipe projecting axially into the rotor through said central aperture in said second end wall and, within the rotor having means defining a plurality of apertures through which liquid supplied to the feed pipe may be introduced to the interior of the rotor;
   a stationary gas discharge pipe coaxially communicated to said central aperture of said rotor second end wall in spacedly surrounding relation to said liquid feed pipe and via means providing a gas-tight, rotation-permitting interfacial seal between said rotor and said stationary gas discharge pipe;
   an annular mass of gas/liquid permeable packing occupying the interior of the rotor in obscuring relation between said apertures of the liquid feed pipe and said apertures of the rotor outer peripheral sidewall;
   wall means defining a cylindrical chamber spacedly enclosing said rotor and including first end wall, a second opposite end wall and a cylindrical sidewall;
   means defining a liquid outlet conduit from said cylindrical chamber;
   means defining a gas inlet conduit through said chamber cylindrical sidewall, said gas inlet conduit having an open end aimed towards said rotor cylindrical sidewall;
   the liquid outlet apertures being distributed among the gas inlet apertures so that many of the liquid outlet apertures are neighbored by gas inlet apertures and vice versa;
   said rotor cylindrical outer peripheral sidewall having an inner face;
   means defining at least one catchment region occupying at least forty percent of said inner face of said rotor sidewall, said at least one catchment region being contiguous with at least one of said liquid outlet apertures but being non-contiguous with said gas inlet apertures, said at least one catchment region comprising channel means formed in said inner face of said rotor sidewall, each such channel means being oriented to facilitate flow of liquid impinging thereon toward said at least one liquid outlet aperture that is contiguous therewith.

2. The centrifugal gas-liquid contact apparatus of claim 1, wherein:
   said at least one catchment region is constituted by a continuous network of said channel means, which network is contiguous with all of said liquid outlet apertures.

3. The centrifugal gas-liquid contact apparatus of claim 2, wherein said continuous network of said channel means consists of two sets of said channel means, the channel means within each set being parallel to each other, the sets intersecting substantially at right angles and the liquid outlet apertures being located at the intersections of said sets.

* * * * *